Jan. 3, 1967  H. J. LARRIGAN ETAL  3,295,365
EXTENSOMETER
Filed Jan. 4, 1965  3 Sheets-Sheet 1

INVENTORS
HARRY J. LARRIGAN
MICHAEL J. BROWNE
BY CHARLES H. ADAMS

Robert J. Schaap
ATTORNEY

INVENTORS
HARRY J. LARRIGAN
MICHAEL J. BROWNE
CHARLES H. ADAMS
BY *Robert J. Schaap*
ATTORNEY

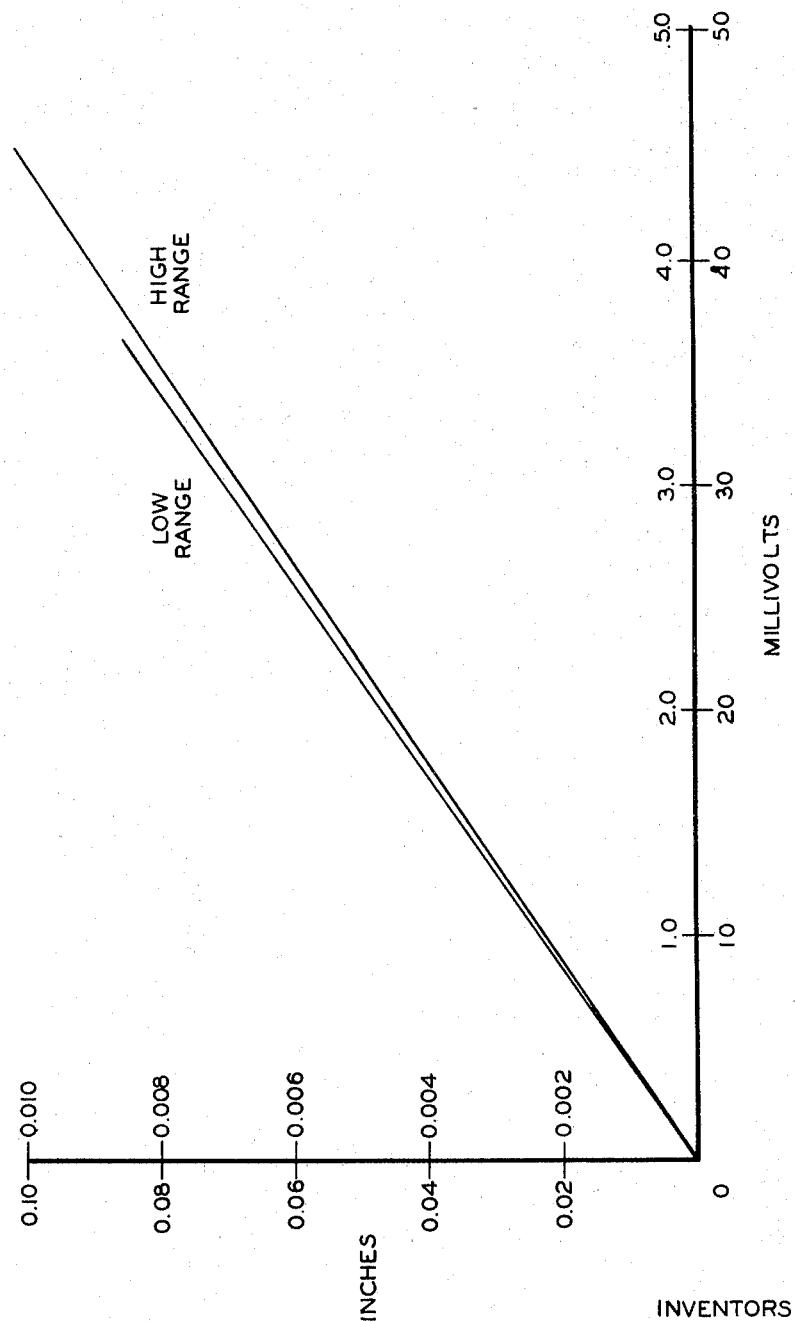

United States Patent Office 3,295,365
Patented Jan. 3, 1967

3,295,365
EXTENSOMETER
Harry J. Larrigan, St. Louis, Michael J. Browne, Rolla, and Charles H. Adams, St. Louis, Mo., assignors to Monsanto Company, St. Louis, Mo., a corporation of Delaware
Filed Jan. 4, 1965, Ser. No. 422,970
13 Claims. (Cl. 73—95)

This invention relates in general to certain new and useful improvements in devices for measuring mechanical deformation and more particularly, to extensometers used for measuring creep in plastic and synthetic resinous test elements.

The displacement and mechanical deformation or so-called "creep" of structural elements, particularly those formed of plastic and synthetic resinous materials is a problem which often confronts the designer of structural elements. The manufacturers of plastic materials used in structural elements are most seriously confronted with the problem of designing the plastic material to overcome problems of mechanical deformation, deflection and displacement. Accordingly, during the processing and manufacture of plastic materials, it is often necessary to evaluate structural displacement and deformation of test strips of the plastic material. After the deflection measurements have been made, suitable plasticizers or other additives may be incorporated into the plastic material as necessary. It has been the practice to subject these structural elements to wide ranges of loading and simultaneously therewith measure the structural displacement or deformation appearing at various points along the structural element. Moreover, it has been the practice to measure the displacement or deformation as a function of time.

It has been a common practice in the prior art to employ various devices employing micrometers for measuring the degree of deformation or deflection of plastic test samples. However, devices of this type required careful setting and constant surveillance in order to eliminate unauthorized displacement of the measuring device. Moreover, devices employing micrometers were not particularly accurate and were difficult to read.

There have been various attempts to employ strain gauge sensing elements with extensometers for measuring the degree of deformation in test samples. One of the more successful devices of this latter named type was constructed with two opposed clamping devices for holding opposite ends of a piece of plastic test material. Connected between the opposing clamps was a generally U-shaped or V-shaped piece of flexible metal. Cemented or otherwise rigidly secured to the elbow of the flexible metal was a resistance bonded strain gauge which was designed to provide electrical outputs as a result of strain on the flexible metal. As the plastic material extended, the metal would move and, in turn, provide a direct reading output on the strain gauge. However, these devices were not designed for measurement of the initial creep or deformation inasmuch as they were only capable of measuring creep starting at 0.030 of an inch. Therefore, they were totally unsatisfactory for measuring very small amounts of deformation in the area of 0.001 or 0.002 of an inch. The initial measurement of creep in the first one to two thousandth of an inch is a critical and important measurement of creep. Therefore, these devices failed in the areas where a great need was required.

Devices which employed these strain gauges were also inaccurate in that these devices had to be provided with a so-called "break-away" joint. The break-away joint was designed so that the sample would slip through the attachment lip upon severance. The break-away joint inevitably created some frictional contact and interfered with accurate measurements in the initial creep region.

It is therefore the primary object of the present invention to provide a deformation measuring device which is capable of accurately measuring deformation of test samples over a wide range.

It is another object of the present invention to provide a deformation measuring device of the type stated which is capable of measuring linear changes accurately to at least .001 of an inch over the full deformation range desired.

It is an additional object of the present invention to provide a deformation measuring device of the type stated which contains a minimum of moving parts, and includes no inherent frictional contact which interferes with the measurement of deflection.

It is also an object of the present invention to provide a deformation measuring device of the type stated which can be manufactured at a low cost in a relatively small compact unit.

It is another salient object of the present invention to provide a deformation measuring device of the type stated which is capable of converting mechanical motion into electrical signals for direct readout measurements on an electrical indicating device.

With the above and other objects in view, our invention resides in the novel features of form, construction, arrangement and combination of parts presently described and pointed out in the claims.

In the accompanying drawings (3 sheets):

FIGURE 3 is a chart showing the electrical output as a measurement of deformation for a low and high range of deformation for illustrating the accuracy of the deformation measuring device.

Figure 1:
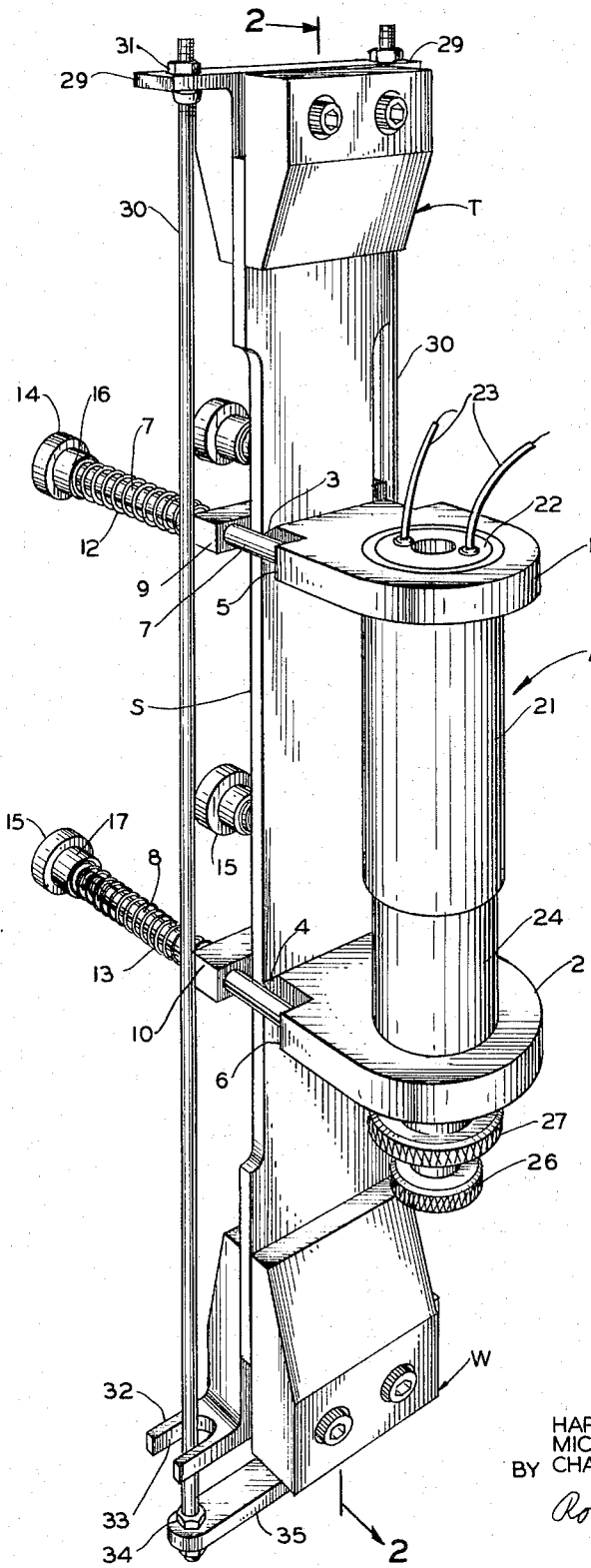
FIGURE 1 is a perspective view of a deformation measuring device constructed in accordance with and embodying the present invention.

Generally speaking, the deformation or tensile creep measuring device or so-called "extensometer" of the present invention comprises a pair of opposed vertically spaced clamping mechanisms which are designed to rigidly engage a test sample which generally consists of a plastic strip having preselected dimensions. The clamping mechanisms are provided with means for releasably engaging upper and lower ends or intermediate portions of the test sample. The upper clamping mechanism is provided with a linear variable differential transformer coil which is, in turn, enclosed within an outer cylinder, the inside diameter of which forms part of an air bearing. The lower clamping mechanism is provided with an upstanding cylindrical plunger which extends within the open ended cylinder on the upper clamping mechanism. The tolerance is sufficiently close to constitute an air bearing between the two extensible cylinders which provide axial deformation. Secured to the projecting plunger on the lower clamping mechanism is a core of the linear variable differential transformer which extends into the coil of said transformer. Thus, as the sample extends due to external forces applied thereto, the core will shift within the coil causing a change in the mutual inductance and thereby directly changes the electrical output from the linear variable differential transformer. This change, of course, is registered on a suitable electrical measuring device.

Referring now in more detail and by reference characters to the drawings which illustrate a preferred embodiment of the present invention, A designates a deformation measuring device, often termed an "extensometer" in the art. The extensometer A generally comprises upper and lower vertically spaced clamping plates 1, 2, each of which is provided with inwardly extending, relatively sharp knife-like clamping projections 3, 4, respectively.

Each of the clamping plates 1, 2 is formed with rearwardly facing shoulders 5, 6, respectively, reference being made to FIGURE 1, on each transverse side of the projections 3, 4, and extending from each of the shoulders 5, 6 are pairs of guide pins 7, 8, respectively.

Figure 2:
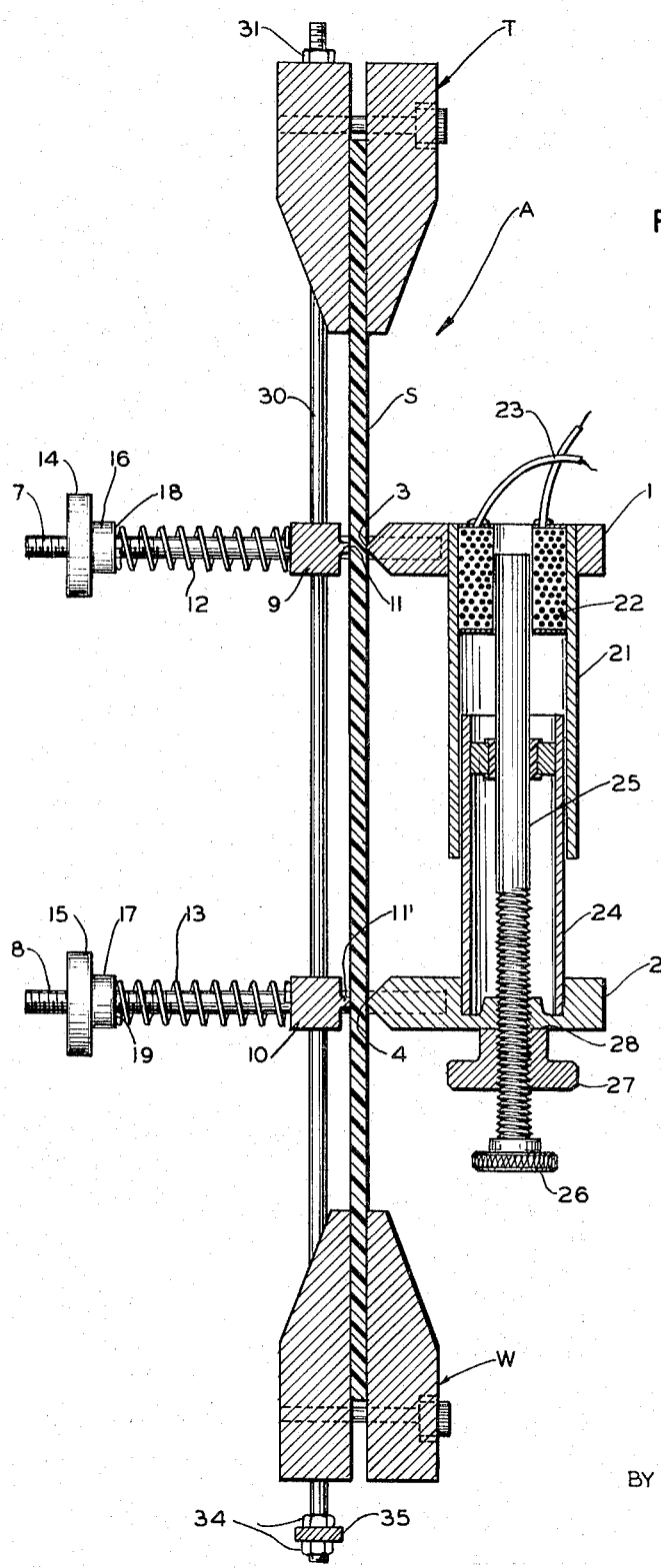
FIGURE 2 is a fragmentary vertical sectional view taken along line 2—2 of FIGURE 1.

Operatively mounted on each of the sets of guide pins 7, 8 and being shiftable thereon are clamping bars 9, 10 respectively, which are maintained in horizontal alignment with the clamping plates 1, 2 and are designed to clamp a plastic test sample S in the manner as shown in FIGURE 1. Each of the clamping bars 9, 10 is provided with forwardly extending sample engaging ribs 11, 11', respectively, substantially as shown in FIGURE 2. By further reference to FIGURE 1, it can be seen that the clamping bars 9, 10 are biased into engagement with the sample S by means of compression springs 12, 13 which are disposed about each of the guide pins 7, 8 and which are retained by means of enlarged heads 14, 15. Each of the sets of guide pins 7, 8 is provided with threaded rearward ends for threadedly accommodating each of the heads 14, 15 so that the heads 14, 15 may be adjustably threaded to selected lengths along each of the guide pins 7, 8. Each of the heads 14, 15 is in turn integrally provided with forwardly extending internally threaded sleeves 16, 17 for movement on the threaded terminal ends of each of the guide pins 7, 8. Moreover, the sleeves 16, 17 provide forwardly projecting shoulders 18, 19 which engage the outer ends of each of the compression springs 12, 13 in the manner as shown in FIGURE 1. Thus by adjustment of the heads 14, 15, it is possible to selectively maintain a desired amount of tension on the clamping bars 9, 10 for retaining the sample S.

By further reference to FIGURE 1, it can be seen that the sample S is secured at its upper end to any convenient supporting structure T. In actuality, the supporting structure T would be a suitable clamp provided with a conventional mechanism for releasably engaging with the upper end of the sample S and moreover, would be secured to a suitable support for suspension of the sample S. Secured to the lower end of the sample S is a selected weight W. Again, the weight W would be provided with a conventional means, such as clamping screws for releasable securement to the lower end of the sample S. In this connection, it should also be understood that a multitude of weights W can be employed depending upon the particular type of sample which is being tested.

The clamping plates 1, 2 are vertically shiftable with respect to each other, and maintained within vertical alignment by means of a fluid operable connecting mechanism 20 which comprises a depending open-ended cylinder 21 secured to the underside of the clamping plate 1. Also mounted on the underside of the clamping plate 1 and being concentrically fixed within the cylinder 21 is a linear variable differential transformer coil 22. It is to be noted that the linear variable differential transformer coil 22 is provided with a cord set 23 for ultimate connection to a suitable electrical indicator or readout device. The electrical indicator is conventional and, therefore, not described in detail herein.

Rigidly secured to the upper face of the lower clamping plate 2 and extending concentrically into the bore of the cylinder 21 is a cooperating cylinder 24 which is also provided with an open upper end and is internally bored. Each of the cylinders 21, 24 is reamed in a turret lathe to approximately desired dimension in the range of approximately 0.003 of an inch to 0.004 of an inch. The elements are then finally machined on a honing machine to a very close tolerance with an average radial thickness between the cylinders 21, 24 of approximately 0.000150 of an inch. When the cylinder 24 is inserted in the cylinder 21, it will engage a small quantity of air which contemplates the employment of this air as a fluid bearing for replacement of metal-to-metal bearings lubricated normally with thin films of highly viscous oil. The use of a relatively low viscosity fluid, such as air, reduces any frictional drag, and provides accurate guidance when the cylinder 24 is shifted with respect to the cylinder 21. Accordingly, due to the close matching of the exterior surface of the cylinder 24 and the interior surface of the cylinder 21, a true air bearing is maintained between these two surfaces. This type of air bearing is more fully described in pamphlet No. X–SP–504 of the Sunnen Products Company of St. Louis, Missouri.

Extending upwardly from the central portion of the cylinder 24 is a ferromagnetic pin 25 which extends into the coil 22 and serves as the core of the linear variable differential transformer. By reference to FIGURE 2, it can be seen that as the clamping plate 2 shifts with respect to the clamping plate 1, the core or pin 25 will shift with respect to its original position in the coil 22 and thereby create a voltage differential.

When a tensional creep or deformation is encountered, the air bearing relationship between the cylinders 21, 24 causes the cylinder 24 to extend within the cylinder 21. This extension provides a displacement of the pin 25 and the coil 22 which, as previously indicated, represents the core of the linear variable differential transformer. This displacement induces a voltage within the coil 22 and produces an electrical readout which is transmitted to a suitable electrical measuring device (not shown) through the cord set 23.

Secured to the lower end of the clamping plate 2 is a zero adjust screw 26 which integrally merges with the lower end of the ferromagnetic pin 25. The zero adjust screw 26 is releasably locked by means of a locking washer 27 which, in turn, engages a flat surface 28 forming the underside of the clamping plate 2. Moreover, the lower clamping plate 2 is provided with an internally threaded section for accommodation of the screw 26 so that the screw will change axial position when turned. Thus, after a sample is secured between the clamping plates 1, 2, the zero adjust screw 26 is turned until the pin 25 is so positioned within the coil 22 that a zero reading is indicated on the electrical measuring readout device.

The device of the present invention has produced far superior results from any previously known deformation measuring device and is capable of measuring linear and reproduceable creep measurement in the range of 0.000 of an inch to 0.1000 of an inch. The device is also capable of incremental measuring of 0.001 of an inch. The two cylinders 21, 24 are formed of a stainless steel non-magnetic material and are non-lubricated. By virtue of perfect concentricity, fine finish and minute radial clearance, it is possible to maintain this air bearing relationship. When deflection of the sample S occurs, the air bearing will permit a linear extension of the cylinder 24 within the cylinder 21 without creating any frictional interference.

After the sample S has reached its maximum extension, the sample will often sever or break at its weakest point causing the weight W to fall. It is conceivable that the outer surface of the cylinder 24 could strike some abutment during its fall and thereby injure or mar the exterior surface thereof. Accordingly, the deformation measuring device A of the present invention is provided with a mechanism for limiting the downward movement of the weight W with the clamping plate 2 after the sample S has severed. The supporting structure T is provided with a pair of outwardly extending horizontal flanges 29 which are suitably apertured to accommodate support rods 30. The support rods 30 are maintained in the flanges 29 by means of enlarged heads 31 formed on the ends of each of the support rods 30. Each of the weights W is provided with outwardly extending flanges 32 along each of its transverse margins which lie in vertical registration with the support flanges 29. The flanges 32, moreover, are provided with enlarged slots 33 for accommodating the support rods 30 in the manner as shown in FIGURE 1.

Each of the support rods 30 is provided with nuts 34 at its lower end for interconnection by a connecting bar 35. Thus, it can be seen that the nut 34 can be removed for disconnecting the connecting bar 35 and thereby remove the support rods 30 from the slots 33. Moreover, it can be seen that the support rods 30 have a greater length than the overall length of the test sample S. In this manner, when the sample S severs, the weight W and the clamping plate 2 carried therewith will fall until the bottom faces of the flanges 32 strike the nuts 34, thereby limiting the downward movement of the weight W. In this manner, the cylinder 24 is protected from unauthorized contact with any element which may mar the surface thereof. It should be recognized that the slots 33 are sufficiently large so that there is no frictional contact between the support rods 30 and the flanges 32. Thus, it can be seen that the mechanisms for limiting downward movement of the weight W in no way frictionally interferes with deformation measurement.

Our invention is further illustrated by but not limited to the following examples:

EXAMPLE 1

Example 1 illustrates test data showing the use of the previously described extensometer for a 212 hour period. A piece of plastic was secured to the upper clamp T and the weight W of an extensometer of the present invention. The plastic sample had a gauge length of 2.00 inches and an overall thickness of 0.125 inch with an average width of 0.500 inch. At zero time, the lower end of the sample was provided with a 60 pound weight initially producing an initial reading of 1.25 millivolts. Thereafter, different loads were applied producing various millivolt readings which are set forth in the table below.

| Load lbs. | Millivolt reading |
|---|---|
| 60 | 1.25 |
| 80 | 1.55 |
| 100 | 1.85 |
| 20 | 2.30 |
| 40 | 2.80 |
| 60 | 3.35 |
| 80 | 3.80 |
| 200 | 4.45 |
| 20 | 5.2 |
| 40 | 5.85 |
| 60 | 6.6 |
| 80 | 7.35 |
| 300 | 8.05 |
| 20 | 9.0 |
| 40 | 10.15 |
| 60 | 11.1 |
| 60 | 12.5 |

It is to be noted that loading of 60 pounds was maintained producing a millivolt reading of 6.6 at 1 minute from the load to the reading point. The sample fractured after 213.6 hours.

EXAMPLE 2

In the present example, four extensometers of the type described were constructed, calibrated and tested for consistent and accurate results. For purposes of designation, each of the extensometers will be listed as extensometer numbers 1, 2, 3 and 4. Each of the clamping plates 1, 2 was maintained at a distance of exactly 2 inches in order to measure the creep for comparison of results in each of the four extensometers. The following table provides the data for each of the extensometers, the specimen load and the stress.

| Extensometer No. | Specimen | | Load (Lbs.) | Stress (Lbs. Per Sq. In.) |
|---|---|---|---|---|
| | Width, in. | Thickness, in. | | |
| 1 | 0.500 | 0.133 | 40 | 602 |
| 2 | 0.500 | 0.125 | 80 | 1,280 |
| 3 | 0.502 | 0.124 | 140 | 2,250 |
| 4 | 0.502 | 0.133 | 180 | 2,700 |

Each of the specimens was formed of the same plastic material employed in Example 1. Each of the tests was carried out in a 50 percent relative humidity controlled environment at 23° C. The following table illustrates the close correlation between each of the four extensometers and shows the voltage output as a function of the extension in inches. It can be seen that three tests were run on each extensometer and that the data for each of the extensometers is very closely correlated.

*Table III*

METER NO. 1

| Extension (Inches) | .001 | .002 | .004 | .008 | .0125 | .025 | .050 | .075 | .100 |
|---|---|---|---|---|---|---|---|---|---|
| Voltage Output | .47 | .93 | 1.9 | 3.75 | 5.85 | 11.32 | 23.95 | 36.48 | 48.76 |
| | .45 | .90 | 1.80 | 3.70 | 5.83 | 11.85 | 23.87 | 36.40 | 48.72 |
| | .50 | .98 | 1.90 | 3.77 | 5.87 | 11.80 | 23.90 | 36.50 | 48.75 |

METER NO. 2

| Extension (Inches) | .001 | .002 | .004 | .008 | .0125 | .025 | .050 | .075 | .100 |
|---|---|---|---|---|---|---|---|---|---|
| Voltage Output | .43 | .85 | 1.73 | 3.45 | 5.38 | 10.80 | 21.90 | 33.10 | 44.00 |
| | .38 | .78 | 1.60 | 3.32 | 5.30 | 10.62 | 21.60 | 32.80 | 43.82 |
| | .40 | .80 | 1.68 | 3.40 | 5.32 | 10.70 | 21.65 | 32.75 | 43.85 |

METER NO. 3

| Extension (Inches) | .001 | .002 | .004 | .008 | .0125 | .025 | .050 | .075 | .100 |
|---|---|---|---|---|---|---|---|---|---|
| Voltage Output | .42 | .83 | 1.70 | 3.58 | 5.58 | 11.13 | 22.60 | 34.48 | 46.63 |
| | .36 | .73 | 1.65 | 3.45 | 5.50 | 11.10 | 22.50 | 34.34 | 46.50 |
| | .35 | .75 | 1.70 | 3.43 | 5.48 | 11.12 | 22.50 | 34.35 | 46.50 |

*Table III.*—Continued

METER NO. 4

| Extension (Inches) | .001 | .002 | .004 | .008 | .0125 | .025 | .050 | .075 | .100 |
|---|---|---|---|---|---|---|---|---|---|
| Voltage Output | .32 | .70 | 1.48 | 3.00 | 4.77 | 9.60 | 19.48 | 29.78 | 40.50 |
|  | .30 | .70 | 1.45 | 3.00 | 4.75 | 9.60 | 19.47 | 29.78 | 40.50 |
|  | .35 | .75 | 1.50 | 3.00 | 4.78 | 9.64 | 19.53 | 29.85 | 40.58 |

EXAMPLE 3

Each of the four extensometers of Example 2 were employed in three test runs with additional samples. The following data showing the displacement as a function of voltage output illustrates the close correlation obtainable on the extensometers.

*Table IV*

METER NO. 1

| Extension (Inches) | .001 | .002 | .004 | .008 | .0125 | .025 | .050 | .075 | .100 |
|---|---|---|---|---|---|---|---|---|---|
| Voltage Output | .40 | .80 | 1.70 | 3.32 | 5.22 | 10.55 | 21.40 | 32.45 | 43.27 |
|  | .45 | .85 | 1.68 | 3.37 | 5.30 | 10.55 | 21.40 | 32.50 | 43.30 |
|  | .42 | .87 | 1.68 | 3.40 | 5.30 | 10.60 | 21.40 | 32.50 | 43.30 |

METER NO. 2

| Extension (Inches) | .001 | .002 | .004 | .008 | .0125 | .025 | .050 | .075 | .100 |
|---|---|---|---|---|---|---|---|---|---|
| Voltage Output | .40 | .85 | 1.80 | 3.65 | 5.70 | 11.50 | 23.45 | 35.70 | 47.65 |
|  | .45 | .90 | 1.85 | 3.70 | 5.75 | 11.60 | 23.50 | 35.75 | 47.75 |
|  | .50 | .98 | 1.90 | 3.72 | 5.82 | 11.65 | 23.55 | 35.80 | 47.80 |

METER NO. 3

| Extension (Inches) | .001 | .002 | .004 | .008 | .0125 | .025 | .050 | .075 | .100 |
|---|---|---|---|---|---|---|---|---|---|
| Voltage Output | .35 | .75 | 1.65 | 3.40 | 5.40 | 11.00 | 22.35 | 34.00 | 46.05 |
|  | .40 | .80 | 1.70 | 3.50 | 5.50 | 11.05 | 22.37 | 34.10 | 46.10 |
|  | .45 | .90 | 1.80 | 3.55 | 5.55 | 11.10 | 22.40 | 34.20 | 46.17 |

METER NO. 4

| Extension (Inches) | .001 | .002 | .004 | .008 | .0125 | .025 | .050 | .075 | .100 |
|---|---|---|---|---|---|---|---|---|---|
| Voltage Output | .35 | .72 | 1.50 | 3.02 | 4.80 | 9.60 | 19.40 | 29.55 | 40.12 |
|  | .20 | .60 | 1.35 | 2.90 | 4.65 | 9.50 | 19.20 | 29.40 | 40.00 |
|  | .25 | .60 | 1.40 | 2.95 | 4.70 | 9.52 | 19.30 | 29.45 | 40.05 |

Each of the extensometers in Table IV, namely the extensometers labeled 1–4, was tested for efficiency by testing and correlating the voltage output as a function of the creep or deformation in inches for high and low loading. The plot of deformation versus millivolt output for extensometer number 2 is shown in FIGURE 3. The deformation over a range of 0 to 0.010 inch was plotted as a function of millivolt output for a range of 0 to 5.0 millivolts for the low loading. The deformation over a range of 0 to 0.10 inch was plotted as a function of millivolt output for a range of 0 to 50 millivolts for high loadings. The close correlation for high and low loading can be observed from FIGURE 3. Each of the other extensometers, namely 1, 3 and 4, produced similar results.

Although the above described extensometer was conceived for the specific application of testing samples, the device is adaptable for many applications, such as establishing elastic modulus, measuring degrees of expansion, contraction, creep and deflection or for use in determining coefficients thereof.

It should be understood that changes and modifications in the form, construction, arrangement and combination of parts presently described and pointed out may be made and substituted for those herein shown without departing from the nature and principle of our invention.

What we desire to claim and secure by Letters Patent is:

1. A deformation measuring apparatus for indicating the magnitude of deformation in a sample comprising in combination first and second spaced opposed clamping means for releasably retaining the sample to be measured, means attached to said sample to cause deformation thereof, fluid bearing means operatively connecting said first and second clamping means and being adapted to provide substantially friction-free shiftable movement between said first and second clamping means, and means operatively associated with said clamping means for indicating the degree of deformation of said sample.

2. A deformation measuring apparatus for indicating the magnitude of deformation in a sample comprising in combination first and second spaced opposed clamping means for releasably retaining the sample to be measured, means attached to said sample to cause deformation thereof, means associated with said clamping means for adjustably maintaining a desired amount of clamping force on said sample, fluid bearing means operatively connecting said first and sescond clamping means and being adapted to provide substantially friction-free shiftable movement between said first and second clamping means, and means operatively associated with said clamping means for indicating the deformation of said sample.

3. A deformation measuring apparatus for indicating the magnitude of deformation in a sample comprising in combination first and second spaced opposed clamping means for releasably retaining the sample to be measured, means attached to said sample to cause deformation thereof, air bearing means operatively connecting said first and second clamping means and being adapted to provide substantially friction-free shiftable movement between said first and second clamping means, and means operatively associated with said clamping means for indicating the deformation of said sample.

4. A deformation measuring apparatus for indicating the magnitude of deformation in a sample comprising in combination first and second spaced opposed clamping means for releasably retaining the sample to be measured, means attached to said sample to cause deformation thereof, fluid bearing means operatively connecting said first and second clamping means and being adapted to provide substantially friction-free shiftable movement between said first and second clamping means, and linear variable differential transformer means operatively associated with said fluid bearing means for sensing and measuring the deformation of said sample.

5. A deformation measuring apparatus for indicating the magnitude of deformation in a sample comprising in combination first and second spaced opposed clamping means for releasably retaining the sample to be measured, means attached to said sample to cause deformation thereof, a cylindrical element associated with said first clamping means and extending toward said second clamping means, a plunger associated with said second clamping means and extending into said cylindrical element, said cylindrical element and plunger being sized to retain a fluid media therebetween for providing air lubrication and being adapted to provide substantially friction-free shiftable movement between said first and second clamping means, and means operatively associated with said clamping means for indicating the deformation of said sample.

6. A deformation measuring apparatus for indicating the magnitude of deformation in a sample comprising in combination first and second spaced opposed clamping means for releasably retaining the sample to be measured, means attached to said sample to cause deformation thereof, a cylindrical element associated with said first clamping means and extending toward said second clamping means, a plunger associated with said second clamping means and extending into said cylindrical element, said cylindrical element and plunger being sized to retain a fluid media therebetween for providing air lubrication and being adapted to provide substantially friction-free shiftable movement between said first and second clamping means, the radial displacement between the interior wall of said cylindrical element and the exterior wall of said plunger being no greater than 150 millionth of an inch, and means operatively associated with said clamping means for indicating the deformation of said sample.

7. A deformation measuring apparatus for indicating the magnitude of deformation in a sample comprising in combination first and second spaced opposed clamping means for releasably retaining the sample to be measured, means attached to sample to cause deformation thereof, a cylindrical element associated with said first clamping means and extending toward said second clamping means, a plunger associated with said second clamping means and extending into said cylindrical element, said cylindrical element and plunger being sized to retain a fluid media therebetween for providing air bearing lubrication and being adapted to provide substantially friction-free shiftable movement between said first and second clamping means, a coil capable of inducing a voltage operatively disposed within said cylindrical element, and a ferromagnetic element operatively mounted on said plunger and extending into said coil, whereby displacement between said first and second clamping means will shift said element and induce a voltage in said coil for measuring the displacement of and deformation of said sample.

8. A deformation measuring apparatus for indicating the magnitude of deformation in a sample comprising in combination first and second spaced opposed clamping means for releasably retaining the sample to be measured, means attached to said sample to cause deformation thereof, a cylindrical element associated with said first clamping means and extending toward said second clamping means, a plunger associated with said second clamping means and extending into said cylindrical element, said cylindrical element and plunger being sized to retain a fluid media therebetween for providing air lubrication and being adapted to provide substantially friction-free shiftable movement between said first and second clamping means, a linear variable differential transformer coil capable of inducing a voltage operatively disposed within said cylindrical element, and a ferromagnetic element operatively mounted on said plunger and extending into said coil, whereby displacement between said first and second clamping means will shift said element and induce a voltage in said coil for measuring the deformation of said sample.

9. A deformation measuring apparatus for indicating the magnitude of deformation in a sample comprising in combination first and second spaced opposed clamps for releasably retaining the sample to be measured, means for releasably securing the upper end of said sample in said first clamp, weighted means attached to the lower end of said sample for causing deformation thereof, a clamping bar formed on each of said clamps and engaging one flat surface of said sample, cooperating knife-like edges operatively associated with each of said clamps for operative engagement of the opposite flat surfaces of said sample, fluid bearing means operatively connecting said first and second clamps and being adapted to provide substantially friction-free shiftable movement between said first and second clamps and means operatively associated with said clamps for indicating the deformation of said sample.

10. A deformation measuring apparatus for indicating the magnitude of deformation in a sample comprising in combination first and second spaced opposed clamps for releasably retaining the sample to be measured, means for releasably securing the upper end of said sample in said first clamp, weighted means attached to the lower end of said sample for causing deformation thereof, a clamping bar formed on each of said clamps and engaging one flat surface of said sample, cooperating knife-like edges operatively associated with each of said clamps for operative engagement of the opposite flat surfaces of said sample, biasing means on each of said clamps for normally biasing each of the cooperating clamping bars and knife-like edges toward each other and into engagement with said sample, means operatively associated with said biasing means on each of said clamps for adjusting the degree of bias maintained on the cooperating clamping bars and knife-like edges, fluid bearing means operatively connecting said first and second clamps and being adapted to provide substantially friction-free shiftable movement between said first and second clamps and means operatively associated with said clamps for indicating the deformation of said sample.

11. A deformation measuring apparatus for indicating the magnitude of deformation in a sample comprising in combination upper and lower spaced opposed clamps for releasably retaining the sample to be measured, means for releasably securing the upper end of said sample in said upper clamp, weighted means attached to the lower end of said sample for causing deformation thereof, a plurality of guide members operatively connected to said upper clamp and extending downwardly to said weighted means, a brace member disposed below said weighted means and being attached to said guide members, guide flanges attached to said weighted means and cooperating with said guide members for guiding the downward movement of said weighted means if said sample should sever, said brace member being located to stop the downward movement of said weighted means, fluid bearing means operatively connecting said upper and lower clamps and being adapted to provide substantially friction-free shiftable movement between said upper and lower clamps, and means operatively associated with said clamps for indicating the deformation of said sample.

12. A deformation measuring apparatus for indicating the magnitude of deformation in a sample comprising in combination upper and lower spaced opposed clamps for releasably retaining the sample to be measured, means for releasably securing the upper end of said sample in said upper clamp, weighted means attached to the lower end of said sample for causing deformation thereof, a plurality of guide members operatively connected to said upper clamp and extending downwardly to said weighted means, a brace member disposed below said weighted means and being attached to said guide members, guide flanges attached to said weighted means and cooperating with said guide members for guiding the downward movement of said weighted means if said sample should sever, said brace member being located to stop the downward movement of said weighted means, a clamping bar formed on each of said clamps and engaging one flat surface of said sample, cooperating knife-like edges operatively associated with each of said clamps for operative engagement of the opposite flat surfaces of said sample, biasing means on each of said clamps for normally biasing each of the cooperating clamping bars and knife-like edges toward each other and into engagement with said sample, means operatively associated with said biasing means on each of said clamps for adjusting the degree of bias maintained on the cooperating clamping bars and knife-like edges, fluid bearing means operatively connecting said upper and lower clamps and being adapted to provide substantially friction-free shiftable movement between said upper and lower clamps, and means operatively associated with said clamps for indicating the deformation of said sample.

13. A deformation measuring apparatus for indicating the magnitude of deformation in a sample comprising in combination upper and lower spaced opposed clamps for releasably retaining the sample to be measured, means for releasably securing the upper end of said sample in said upper clamp, weighted means attached to the lower end of said sample for causing deformation thereof, a plurality of guide members operatively connected to said upper clamp and extending downwardly to said weighted means, a brace member disposed below said weighted means and being attached to said guide members, guide flanges attached to said weighted means and cooperating with said guide members for guiding the downward movement of said weighted means if said sample should sever, said brace member being located to stop the downward movement of said weighted means, a clamping bar formed on each of said clamps and engaging one flat surface of said sample, cooperating knife-like edges operatively associated with each of said clamps for operative engagement of the opposite flat surface of said sample, biasing means on each of said clamps for normally biasing each of the cooperating clamping bars and knife-like edges toward each other and into engagement with said sample, means operatively associated with said biasing means on each of said clamps for adjusting the degree of bias maintained on the cooperating clamping bars and knife-like edges, a cylindrical element associated with the upper of said clamps and extending toward the lower of said clamps, a plunger associated with said lower clamp and extending into said cylindrical element, said cylindrical element and plunger being sized to retain a fluid media therebetween for providing air lubrication and being adapted to provide substantially friction-free shiftable movement between said upper and lower clamps, a linear variable differential transformer coil capable of inducing a voltage operatively disposed within said cylindrical element, and a ferromagnetic element operatively mounted on said plunger and extending into said coil, whereby displacement between said upper and lower clamps will shift said element and induce a voltage in said coil for measuring the deformation of said sample.

References Cited by the Examiner

UNITED STATES PATENTS

| | | | |
|---|---|---|---|
| 1,125,236 | 1/1915 | Whiting | 33—147 |
| 1,133,400 | 3/1915 | Rechniowski | 33—147 |
| 2,177,605 | 10/1939 | Whittemore | 33—147 |
| 2,455,285 | 11/1948 | Versaw | 33—147 |
| 2,821,784 | 2/1958 | Huyser | 33—148 |

FOREIGN PATENTS 182,762    5/1936    Switzerland.

LEONARD FORMAN, *Primary Examiner.*

WILLIAM D. MARTIN, JR., *Assistant Examiner.*